United States Patent [19]

Vanderpool et al.

[11] Patent Number: 5,021,133

[45] Date of Patent: Jun. 4, 1991

[54] ELECTROLYTIC METHOD FOR PRODUCING AMMONIUM PARATUNGSTATE FROM CEMENTED TUNGSTEN CARBIDE

[75] Inventors: Clarence D. Vanderpool; Tai K. Kim, both of Towanda, Pa.

[73] Assignee: GTE Products Corporation, Stamford, Conn.

[21] Appl. No.: 504,480

[22] Filed: Apr. 4, 1990

[51] Int. Cl.$^5$ .................................. C25B 1/00
[52] U.S. Cl. .................................. 204/86; 204/91; 423/53; 423/606
[58] Field of Search ............ 204/86, 91; 423/53, 423/56, 593, 606

[56] References Cited

U.S. PATENT DOCUMENTS

| | | | |
|---|---|---|---|
| 3,936,362 | 2/1976 | Vanderpool et al. | 204/86 |
| 4,283,258 | 8/1981 | Vanderpool et al. | 204/102 |
| 4,624,844 | 11/1986 | Scheithauer et al. | 423/593 |
| 4,664,899 | 5/1987 | Kimmel et al. | 423/440 |

Primary Examiner—T. Tung
Assistant Examiner—David G. Ryser
Attorney, Agent, or Firm—Robert E. Walter; L. Rita Quatrini

[57] ABSTRACT

A method is disclosed for producing ammonium paratungstate from cemented tungsten carbide which comprises subjecting the cemented tungsten carbide to electrolysis by passing about 0.5 to about 20 volts through an ammoniacal solution selected from the group consisting of ammonium hydroxide-ammonium chloride solution, ammonium hydroxide-ammonium carbonate solution, and ammonium hydroxide-ammonium sulfate solution, wherein platinum and the cemented tungsten carbide serve as the anode and wherein the anode is immersed in the solution, to decompose the cemented tungsten carbide and form a solution of ammonium tungstate from which is crystallized ammonium paratungstate.

3 Claims, No Drawings

ELECTROLYTIC METHOD FOR PRODUCING AMMONIUM PARATUNGSTATE FROM CEMENTED TUNGSTEN CARBIDE

BACKGROUND OF THE INVENTION

This invention relates to a method for producing ammonium paratungstate (APT) from cemented tungsten carbide by electrodissolution. Use of this method avoids the use of processes which involve dissolution of the tungsten in alkali or the use of expensive reagents.

Ammonium paratungstate is normally prepared by any one of several well known techniques. One technique involves the dissolution of tungstic acid in ammonium hydroxide to produce ammonium tungstate followed by filtration and evaporation to crystallize ammonium paratungstate. Another technique involves addition of ammonium chloride to sodium tungstate solution to precipitate ammonium paratungstate and leave sodium chloride in solution. Still another technique involves the extraction of a metatungstate species with an organic extracting agent followed by stripping with ammonium hydroxide to produce ammonium tungstate which is evaporated to produce ammonium paratungstate crystals. Another technique involves addition of ammonium hydroxide to ammonium metatungstate solution to precipitate ammonium paratungstate crystals.

The disadvantages of these processes are that they all require preparation of ammonium tungstate by dissolution or oxidation of the tungsten starting material. Tungsten ores, tungsten scrap, or tungsten carbide scrap must be digested in strong alkali directly or first oxidized to tungstic oxide and then digested in strong alkali. The alkali is usually sodium hydroxide. This produces sodium tungstate. To produce ammonium paratungsten the sodium must be eliminated by precipitation of tungstic acid by the addition of acid, which is usually hydrochloric acid. The resulting tungstic acid is then washed until it is free of sodium, which is difficult to do because tungstic acid becomes colloidal during washing, making it very difficult to wash and to handle. The addition of ammonium chloride to sodium tungstate requires the preparation of the sodium tungstate and the yield of ammonium paratungstate is usually low, and the ammonium paratungstate contains sodium.

The extraction of a tungsten species, using an organic extracting agent requires a large investment in equipment and again requires preparation of sodium tungstate for extraction. The preparation of ammonium paratungstate from metatungstate is very expensive since metatungstate is usually prepared from ammonium paratungstate.

SUMMARY OF THE INVENTION

In accordance with one aspect of the invention, there is provided a method for producing ammonium paratungstate from cemented tungsten carbide which comprises subjecting the cemented tungsten carbide to electrolysis by passing about 0.5 to about 20 volts through an ammoniacal solution selected from the group consisting of ammonium hydroxide-ammonium chloride solution, ammonium hydroxide-ammonium carbonate solution, and ammonium hydroxide-ammonium sulfate solution, wherein platinum and the cemented tungsten carbide serve as the anode and wherein the anode is immersed in the solution, to decompose the cemented tungsten carbide and form a solution of ammonium tungstate from which ammonium paratungstate is crystallized.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

The present invention affords a method for preparation of ammonium paratungstate directly from cemented tungsten carbide which is usually scrap cemented tungsten carbide. The advantages of this method over prior methods are there is no oxidation or firing of starting material to tungstic oxide and no digestion in sodium hydroxide is required. Also tungstic acid is not needed, nor is any extraction process.

The starting material is cemented tungsten carbide, that is tungsten carbide with cobalt, iron or nickel as binder. Typically the cemented tungsten carbide contains cobalt at a level of about 3% to about 12% by weight and most typically about 6% by weight. Usually, the material is scrap cemented tungsten carbide such as old cutting tools and carbide parts.

The method involves electrodissolution of the tungsten in an ammoniacal solution which serves as the electrolyte. The electrodissolution technique is well known in the art. The solution can be ammonium hydroxide and ammonium chloride or ammonium hydroxide and ammonium carbonate, or ammonium hydroxide and ammonium sulfate. Most typically the solution is made up of reagent grade ammonium hydroxide, typically about 28% by weight ammonium hydroxide. The chloride, sulfate, or carbonate concentration is sufficient to make the solution conductive but no so concentrated that it interferes with the subsequent crystallization of APT. Typically the solution contains about 5 to about 25% by weight and most typically about 10% by weight of the ammonium chloride, ammonium sulfate or ammonium carbonate in the ammonium hydroxide.

The cemented tungsten carbide material is attached to a piece of platinum wire and these serve as the anode. The anode is immersed in the solution. The cathode is usually a piece of platinum foil which is immersed in the solution.

About 0.5 to 20 volts are passed through the solution. The amperage depends on the size of the carbide pieces. The larger the piece, the larger the amperage. Most typically the amperage is about 0.5 to about 30 amps. This results in the tungsten carbide decomposing and an ammonium tungsten solution being formed. The binder from the cemented tungsten carbide is electroplated and recovered on the cathode.

The elements of Nb, Ta and Ti, if present in the starting carbide material are insolubles in the solution. These are removed usually by filtration.

Ammonium paratungstate is then crystallized from the solution. This is done by evaporating the solution usually to about one-third of its original volume and taking a crystal crop. Generally the purity of this crystal crop is at least about 99.0%.

Other crystal crops can then be taken or the balance of the solution can be evaporated to dryness. When the balance is evaporated to dryness the product is fired to remove impurities from the solution such as ammonium chloride, if necessary.

To more fully illustrate this invention, the following nonlimiting example is presented. All parts, portions and percentages are by weight unless otherwise stated.

EXAMPLE

About 15 parts of ammonium chloride are dissolved in about 140 to about 150 parts of ammonium hydroxide. About 22.1433 parts of cemented tungsten carbide scrap material is attached to platinum wire to serve as the anode. A piece of platinum foil serves as the cathode. Both anode and cathode are immersed in the ammonium chloride-ammonium hydroxide solution. A current is rung through the solution as follows:

| Time | Volts | Amps | Remarks |
| --- | --- | --- | --- |
| 0 | 13.0 | 3.5 | |
| 12 min. | 12.0 | 5.0 | Solution turning brownish-yellow |
| 15 min. | 11.5 | 7.5 | More ammonium hydroxide is added |
| 40 min. | 11.5 | 9.0 | 80° C. |
| 130 min. | 11.5 | 10.0 | |
| 180 min. | 11.5 | 8.0 | |

At the end of three hours the tungsten carbide has lost about 14.9663 parts. The cathode has cobalt metal plated on it. A grayish precipitate is present in the solution which is composed of the oxides of tantalum, niobium and titanium. This is filtered out leaving a pinkish solution of ammonium tungstate. This solution is evaporated to about one-third of its original volume to crystallize or precipitate ammonium paratungstate. A spectrographic analysis of this ammonium paratungstate shows a fairly pure product. The remainder of the solution or mother liquor is evaporated to dryness and fired at about 400° C. to remove ammonium chloride and recover the tungsten as tungstic oxide. Results of the spectrographic analysis are given in the Table below.

TABLE

| | First crystal crop | Product evaporated to dryness |
| --- | --- | --- |
| Al | 5-50 ppm | 0.01-0.1% |
| B | | 10-100 ppm |
| Ca | 1-10 ppm | 10-100 ppm |
| Co | 0.1-1.0% | 1-10% |
| Cr | | 10-100 ppm |
| Cu | | 5-50 ppm |
| Fe | 10-100 ppm | 10-100 ppm |
| Mg | 1-10 ppm | 0.01%-0.1% |
| Mn | | 10-100 ppm |
| Mo | 10-100 ppm | 10-100 ppm |
| Ni | 1-10 ppm | 0.05%-0.5% |
| Si | 1-10 ppm | 0.05%-0.5% |
| Ti | | 5-50 ppm |
| W | 10-100% | 10-100% |

While there has been shown and described what are at present considered the preferred embodiments of the invention, it will be obvious to those skilled in the art that various changes and modifications may be made therein without departing from the scope of the invention as defined by the appended claims.

What is claimed is:

1. A method for producing ammonium paratungstate from cemented tungsten carbide, said method comprising:
    (a) subjecting said cemented tungsten carbide to electrolysis by passing about 0.5 to about 20 volts through an ammoniacal solution selected from the group consisting of ammonium hydroxide and ammonium chloride solution, ammonium hydroxide and ammonium carbonate solution, and ammonium hydroxide and ammonium sulfate solution, wherein platinum and said cemented tungsten carbide serve as an anode, immersing said anode in said solution, decomposing said cemented tungsten carbide and forming a solution of ammonium tungstate;
    (b) crystallizing ammonium paratungstate from said ammonium tungstate solution.

2. A method of claim 1 comprising the additional step of separating from said ammonium tungstate solution any insoluble material that is present in said ammonium tungstate solution.

3. A method of claim 1 wherein said ammonium paratungstate is at least about 99.0% pure.

* * * * *